(12) United States Patent
Kubota et al.

(10) Patent No.: US 7,271,833 B2
(45) Date of Patent: Sep. 18, 2007

(54) IMAGE PICKUP APPARATUS, IMAGE DATA PROCESSING APPARATUS, IMAGE DATA OUTPUTTING METHOD, IMAGE DATA PROCESSING SYSTEM AND IMAGE PICKUP DEVICE

(75) Inventors: Koji Kubota, Saitama-ken (JP); Naoki Kubo, Saitama-ken (JP)

(73) Assignee: Fujifilm Corporation, Minami-Ashigara-shi (JP)

( * ) Notice: Subject to any disclaimer, the term of this patent is extended or adjusted under 35 U.S.C. 154(b) by 741 days.

(21) Appl. No.: 10/367,797

(22) Filed: Feb. 19, 2003

(65) Prior Publication Data
US 2004/0160520 A1 Aug. 19, 2004

(30) Foreign Application Priority Data
Feb. 18, 2002 (JP) ............................. 2002-039914

(51) Int. Cl.
*H04N 9/64* (2006.01)
(52) U.S. Cl. ...................... 348/245; 348/246; 348/247
(58) Field of Classification Search ................ 348/245, 348/246, 247; 438/64
See application file for complete search history.

(56) References Cited

U.S. PATENT DOCUMENTS

| | | | | |
|---|---|---|---|---|
| 5,406,329 A | * | 4/1995 | Kashimura et al. | 348/175 |
| 6,400,824 B1 | * | 6/2002 | Mansoorian et al. | 380/269 |
| 2003/0169342 A1 | * | 9/2003 | Steinberg et al. | 348/207.1 |
| 2003/0223004 A1 | * | 12/2003 | Kubota et al. | 348/294 |
| 2005/0146621 A1 | * | 7/2005 | Tanaka et al. | 348/211.2 |

FOREIGN PATENT DOCUMENTS

| | | |
|---|---|---|
| JP | 1-105671 A | 4/1989 |
| JP | 2000-165720 A | 6/2000 |

* cited by examiner

*Primary Examiner*—Vivek Srivastava
*Assistant Examiner*—Kelly Jerabek
(74) *Attorney, Agent, or Firm*—Birch, Stewart, Kolasch & Birch, LLP

(57) ABSTRACT

Intentionally defective pixels, whose number exceeds a storage capacity of a memory for defect correction, are formed in a predetermined pattern in an image pickup device. There is a plurality of patterns of the defective pixels, each being unique to each camera (image pickup device). An ID of the camera for specifying the pattern is read and defect pattern data corresponding to the ID of the camera is retrieved. Image data is read and the intentionally defective pixels are corrected based on the retrieved defect pattern data. Since the number of the intentionally defective pixels exceeds the storage capacity of the memory for defect correction, the image data cannot be reproduced in a normal manner when the defect pattern data corresponding to the pattern of the intentionally defective pixels cannot be retrieved. Thus, the image pickup device of the camera cannot be used in another image pickup apparatus by a third party.

33 Claims, 5 Drawing Sheets

TABLE REGION 46

| CAMERA ID | DEFECT PATTERN |
|---|---|
| 0001 | 10110 |
| 0002 | 11001 |
| 0003 | 10001 |
| ⋮ | ⋮ |

IMAGE PICKUP APPARATUS, IMAGE DATA PROCESSING APPARATUS, IMAGE DATA OUTPUTTING METHOD, IMAGE DATA PROCESSING SYSTEM AND IMAGE PICKUP DEVICE

BACKGROUND OF THE INVENTION

1. Field of the Invention

The present invention relates to an image pickup apparatus including a solid-state image pickup device such as a charge-coupled device (CCD) image sensor or a complementary metal-oxide semiconductor (CMOS) image sensor, as well as an image data processing apparatus, an image data outputting method, an image data processing system and an image pickup device.

2. Description of the Related Art

Image pickup apparatuses such as digital still cameras or digital video cameras include a solid-state image pickup device such as a CCD image sensor. Such a solid-state image pickup device may have so-called defective pixels formed during production, which are unable to generate a charge according to the amount of received light or which generate noise exceeding a rated value due to unevenness in a dark current.

When the image signal of the defective pixel is displayed, it appears in a picked up image as a defect such as a black noise or a white noise, and significantly degrades the quality of the image. Therefore, when a solid-state image pickup device is produced, whether or not the solid-state image pickup device includes defective pixels is determined during an inspection process. If the solid-state image pickup device includes defective pixels, "defective pixel data", which represents, for example, the positions (coordinates) of the defective pixels, are stored in advance in a storage section (memory) of an image pickup apparatus.

Image pickup apparatuses include an image defect correction device, which corrects defects caused by the defective pixels on the basis of the above "defective pixel data". An example of a technology relating to such an image defect correction device is described in Japanese Patent Application Laid-open (JP-A) No. 1-105671.

Namely, the image defect correction device described above corrects only the defective pixels corresponding to the "defective pixel data", which is stored in advance, on the basis of data of neighboring pixels surrounding each of the defective pixels during the actual picking up of the image. The reason why only the "defective pixel data", which are stored in advance in the memory, are used for correcting the defective pixels is to expedite the actual image picking up process, such as when shooting serial images or a moving image. The above-described method for correcting defective pixels is needed for a compact, light and inexpensive digital still camera.

Regarding the above-described digital still camera, an upper limit of a storage capacity of a memory for storing the "defective pixel data" is determined in advance by considering factors such as cost. The number of defective pixels storable in a typical memory is limited up to 256-1000. Therefore, in order to obtain a good image, defective pixels within the storage capacity of the memory are appropriately corrected on the basis of data of neighboring pixels surrounding each of the defective pixels.

Further, some conventional digital still cameras include an encrypting means for encrypting image data so that an image of the image data can not be viewed by a third party. An example of a technology relating to such encryption is described in JP-A No. 2000-165720.

Assuming that a sales system for selling a so-called single-use type digital still camera, which is lent to and collected from unspecified users, is established, a third party who has rented such a digital still camera may use (divert use of) its image pickup device such as a CCD image sensor or a CMOS image sensor in another image pickup apparatus. It should be noted that, when the above-described image data is encrypted, the encryption imposes an additional load on processing carried out in the image pickup apparatus. Hence, there is a need for improved image pickup technology.

SUMMARY OF THE INVENTION

In view of the aforementioned, the object of the present invention is to provide an image pickup apparatus, an image data processing apparatus, a method for outputting image data, an image data processing system and an image pickup device, which when used together can prevent unauthorized use of the image pickup device included in the image pickup apparatus.

An image pickup apparatus according to a first aspect of the invention comprises an image pickup device provided with defective pixels, which are formed in a predetermined pattern and whose number exceeds an upper limit of a number of pixels whose defects are locally correctable in the image pickup apparatus. An image pickup device according to a second aspect of the invention comprises defective pixels, which are formed in a predetermined pattern and whose number exceeds an upper limit of a number of pixels whose defects are correctable.

In the first or second aspect of the invention, the number of the defective pixels, which have been formed in the predetermined pattern, exceeds the upper limit of a number of pixels storable in a memory, or the like, of the image pickup device for defect correction. Therefore, when the pattern data corresponding to the pattern of the defective pixels cannot be identified, digital image data picked up by the image pickup device cannot be reproduced in a normal manner.

On the other hand, when the pattern data corresponding to the pattern of the defective pixels is identified, the defective pixels, which have been formed in advance, can be appropriately corrected on the basis of the known pattern data, thus providing good image data. Thus, according to the first or second aspect of the invention, since the defective pixels whose number exceeds an upper limit of a number of pixels whose defects are locally correctable in the image pickup apparatus, are formed in a predetermined pattern, unauthorized use of an image pickup device such as a CCD image sensor or a CMOS image sensor can be prevented.

The image pickup apparatus of the first aspect may be a digital camera or an electronic device with an image pickup function, wherein the camera or the apparatus is lent to and collected from unspecified users. In this case, since the image pickup apparatus of the first aspect is structured to prevent unauthorized use of the image pickup device, it is suitable for use in the image pickup apparatus, which is lent to and collected from unspecified users, as is the case with a single-use type digital camera.

Further, in the first or second aspect of the invention, since the image pickup device (hardware) itself is provided with the defective pixels, which are formed in a predetermined pattern and whose number exceeds an upper limit of a number of pixels whose defects are locally correctable in the image pickup apparatus, so that picked up image data cannot be reproduced in a normal manner, no additional load is placed on processing in the image pickup apparatus, and the like, unlike cases in which image data is encrypted.

Furthermore, the defective pixels in the image pickup apparatus of the first aspect may be green pixels corresponding to green components in color information among pixels of the image pickup device. In this case, since the defective pixels are green pixels, whose number is greater than the number of, for example, red or blue pixels, deterioration in S/N (signal to noise ratio) can be minimized.

An apparatus for processing image data according to a third aspect of the invention comprises: a means for reading image data picked up by an image pickup apparatus comprising an image pickup device provided with defective pixels, which are formed in a predetermined pattern and whose number exceeds an upper limit of a number of pixels whose defects are correctable in the image pickup apparatus, and for reading identification data for specifying the pattern; a means for recording pattern data corresponding to the pattern of the defective pixels; a means for retrieving the pattern data associated with the identification data read by the reading means; and a means for correcting the image data based on the pattern data retrieved by the retrieving means.

A method for outputting image data according to a fourth aspect of the invention comprises the steps of: reading image data picked up by an image pickup apparatus comprising an image pickup device provided with defective pixels, which are formed in a predetermined pattern and whose number exceeds an upper limit of a number of pixels whose defects are correctable in the image pickup apparatus; retrieving pattern data corresponding to the pattern of the defective pixels; and correcting the image data on the basis of the pattern data and outputting the corrected image data.

A system for processing image data according to a fifth aspect of the invention comprises: an image pickup apparatus comprising an image pickup device provided with defective pixels, which are formed in a predetermined pattern and whose number exceeds an upper limit of a number of pixels whose defects are locally correctable in the image pickup apparatus, wherein identification data for specifying the pattern is recorded; and an image data processing apparatus comprising: a means for reading image data picked up by the image pickup device of the image pick up apparatus and for reading the identification data for specifying the pattern; a means for recording pattern data corresponding to the pattern of the defective pixels; a means for retrieving the pattern data associated with the identification data read by the reading means; and a means for correcting the image data on the basis of the pattern data retrieved by the retrieving means.

In the third aspect of the invention, the apparatus for processing image data further may comprise a means for outputting the image data corrected at the correcting means to the outside. In this case, the outputting means may be a printer or a recording apparatus for recording on a recording medium.

In the third to fifth aspects, the image data, which has been picked up by the image pickup device including the defective pixels, which are formed in a predetermined pattern and whose number exceeds an upper limit of a number of pixels whose defects are locally correctable in the image pickup apparatus, is read from a recording medium, such as a flash ROM, in the image pickup apparatus. There is a plurality of different patterns of the defective pixels, and the pattern data corresponding to the pattern of the defective pixels recorded in the image data is retrieved. Then, the image data is corrected on the basis of the read pattern data, and is output, for example, to a printer.

According to the third, fourth or fifth aspect of the invention, the number of the defective pixels, which has been formed in the predetermined pattern, exceeds the upper limit of a number of pixels storable in a memory, or the like, of the image pickup device for defect correction. Therefore, when the pattern data corresponding to the pattern of the defective pixels cannot be identified, digital image data picked up by the image pickup device cannot be reproduced in a normal manner. Thus, according to the third, fourth or fifth aspect of the invention, since the defective pixels, whose number exceeds an upper limit of a number of pixels whose defects are locally correctable in the image pickup apparatus, are formed in a predetermined pattern, diversion of use of the image pickup device can be prevented.

It should be noted that, in the invention, the recording medium for recording the image data may be SmartMedia ®, CompactFlash, ATA (AT Attachment) card, floppy disk, CD-R (Compact Disc-Recordable) or CD-RW (Compact Disc-ReWritable). Further, a concept of the image pickup apparatus according to the invention includes a digital still camera, a digital video camera, as well as a cellular phone, a personal computer, a PDA (Personal Digital Assistance), and the like, which are provided with an image pickup function.

DESCRIPTION OF THE PREFERRED EMBODIMENTS

A digital still camera (hereinafter simply referred to as a "camera") of an embodiment of the present invention will now be described based on FIGS. 1 to 6.

The camera of the embodiment is of a so-called single-use type, which is lent to and collected from unspecified users. Further, in the embodiment, the camera is of a compact, light and inexpensive type, and therefore, an upper limit of a number of defective pixels storable in a memory for storing "defective pixel data" included in the camera is 256.

Figure 1:
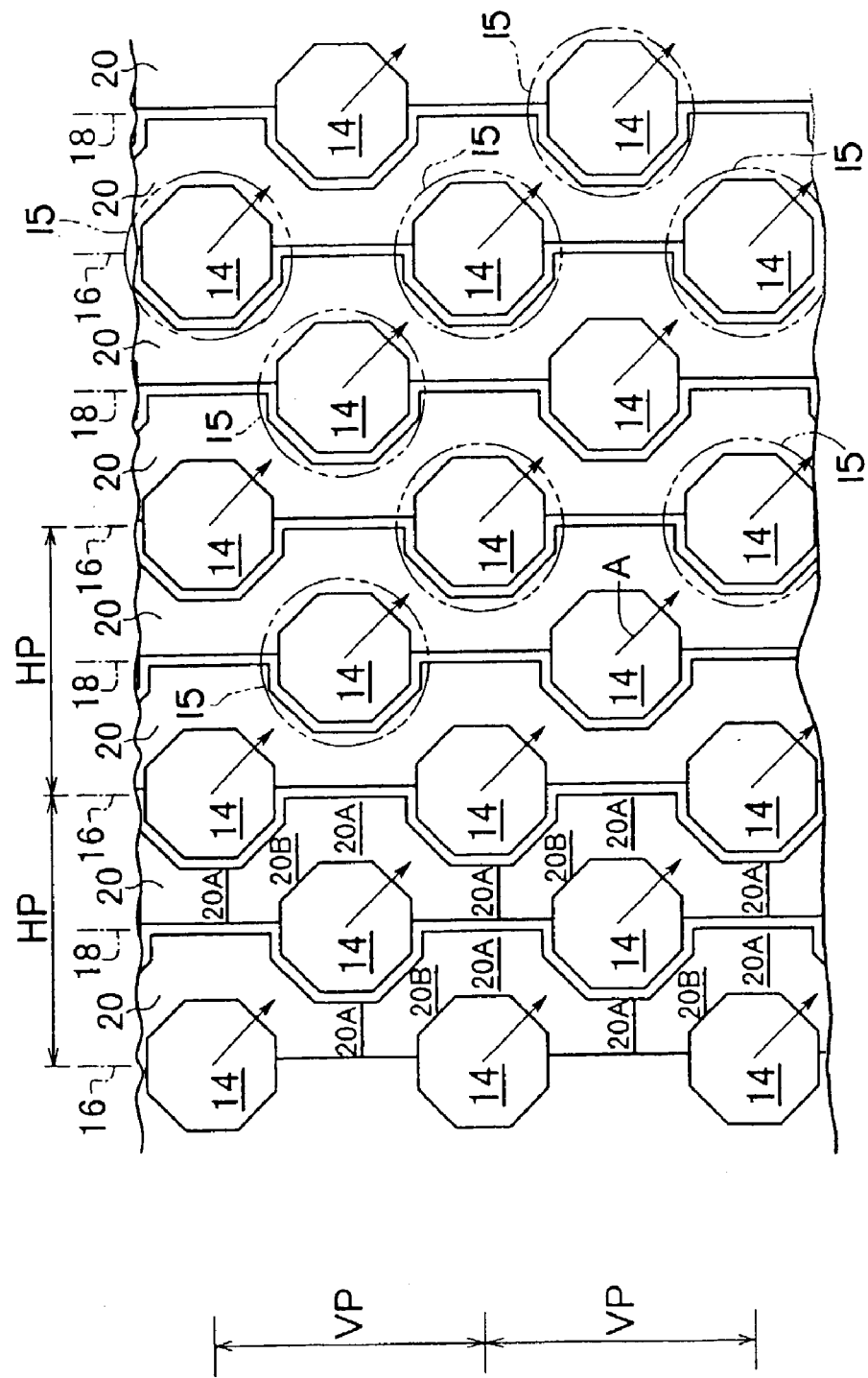
FIG. 1 is a plan view showing a main portion of a CCD image sensor according to an embodiment of the present invention.

As shown in FIG. 1, the CCD image sensor, which is an image pickup device built in the camera, is formed of sets of element columns, each including a first photoelectric conversion element column 16 and a second photoelectric conversion element column 18, which are arranged in a horizontal direction on a semiconductor substrate (not shown). The first photoelectric conversion element column 16 includes photodiodes 14 (pixels which are photoelectric conversion elements), each has an equilateral octagonal shape when viewed from above, arranged in a vertical direction at predetermined intervals (vertical pixel pitch VP). The second photoelectric conversion element column 18 includes the photodiodes 14, which are arranged in the vertical direction at the same intervals as those of the first photoelectric conversion element column 16, and are offset from the photodiodes 14 of the first photoelectric conversion element column 16 in the vertical direction by one half of the vertical pixel pitch VP.

An interval between the mutually adjacent first photoelectric conversion element column 16 and second photoelectric conversion element column 18 (horizontal pixel pitch HP) is the same as the vertical pixel pitch. Photoelectric conversion element rows, which are formed of the photodiodes 14 of the second photoelectric conversion element columns 18, are offset from photoelectric conversion element rows, which are formed of the photodiodes 14 of the first photoelectric conversion element columns 16, in the horizontal direction by one half of the horizontal pixel pitch HP. That is, the photodiodes 14 are arranged in a so-called honeycomb pattern.

It should be noted that, between the mutually adjacent first photoelectric conversion element columns 16 and second photoelectric conversion element columns 18, vertical charge transfer channels 20 are respectively provided for reading out signal charges generated at the photodiodes 14 and transferring the signal charges in the vertical direction. Each of the vertical charge transfer channels 20 includes intruding portions 20A, which intrude between the photodiodes 14 of photoelectric conversion element columns 16 at both sides, and non-intruding portions 20B continuously alternating with each other, so that the vertical charge transfer channels 20 extend in the vertical direction with meandering between the photodiodes 14 arranged in the honeycomb pattern.

Further, the photodiodes 14 at particular positions indicated by imaginary lines in FIG. 1 are photodiodes which are intentionally made defective (hereinafter simply referred to as "intentionally defective pixels") 15. The intentionally defective pixels 15 are formed by covering (masking) surfaces of the photodiodes 14 with aluminum during a process of forming regions for detecting black (optical black portions).

That is, in the embodiment, the intentionally defective pixels 15 are formed in a predetermined pattern and a number of the intentionally defective pixels 15 is determined to exceed the upper limit of a number of pixels (256 pixels) whose defects can be corrected at the memory (the memory for storing the "defective pixel data") of the camera. The number of the intentionally defective pixels 15 exceeding the upper limit of the number of correctable pixels at the memory is, for example, 1000 or more, and the intentionally defective pixels 15 are formed in a regular pattern.

It should be noted that, also in the embodiment, the "defective pixel data" representing positions (coordinates), or the like, of defective pixels, which are unintentionally formed during production of the CCD image sensor, is stored in advance in the storage section (memory) of the camera. Then, also in the embodiment, the defective pixels corresponding to the "defective pixel data" stored in advance are corrected on the basis of the data of neighboring pixels surrounding each of the defective pixels, on the spot during actual image pickup.

The CCD image sensor having the structure described above converts an image of a subject, which is formed by an image pickup lens oriented to the subject, into electric signals. An RGB primary color filter with a G-stripe R/B perfect checker pattern is placed to cover an image pickup surface of the CCD image sensor. That is, in the pixels (photodiodes) 14 respectively corresponding to one of R (red), G (green) and B (blue) filter patterns, a number of G pixels is twice as large as a number of R pixels or B pixels.

Then, in the embodiment, the above-described intentionally defective pixels 15 are formed among the G pixels, whose number is greater than the number of the R or B pixels. Since the intentionally defective pixels 15 are formed mainly among the G pixels, whose number is greater than the number of R or B pixels, in the embodiment, deterioration in S/N (signal to noise ratio) can be minimized.

Figure 2:
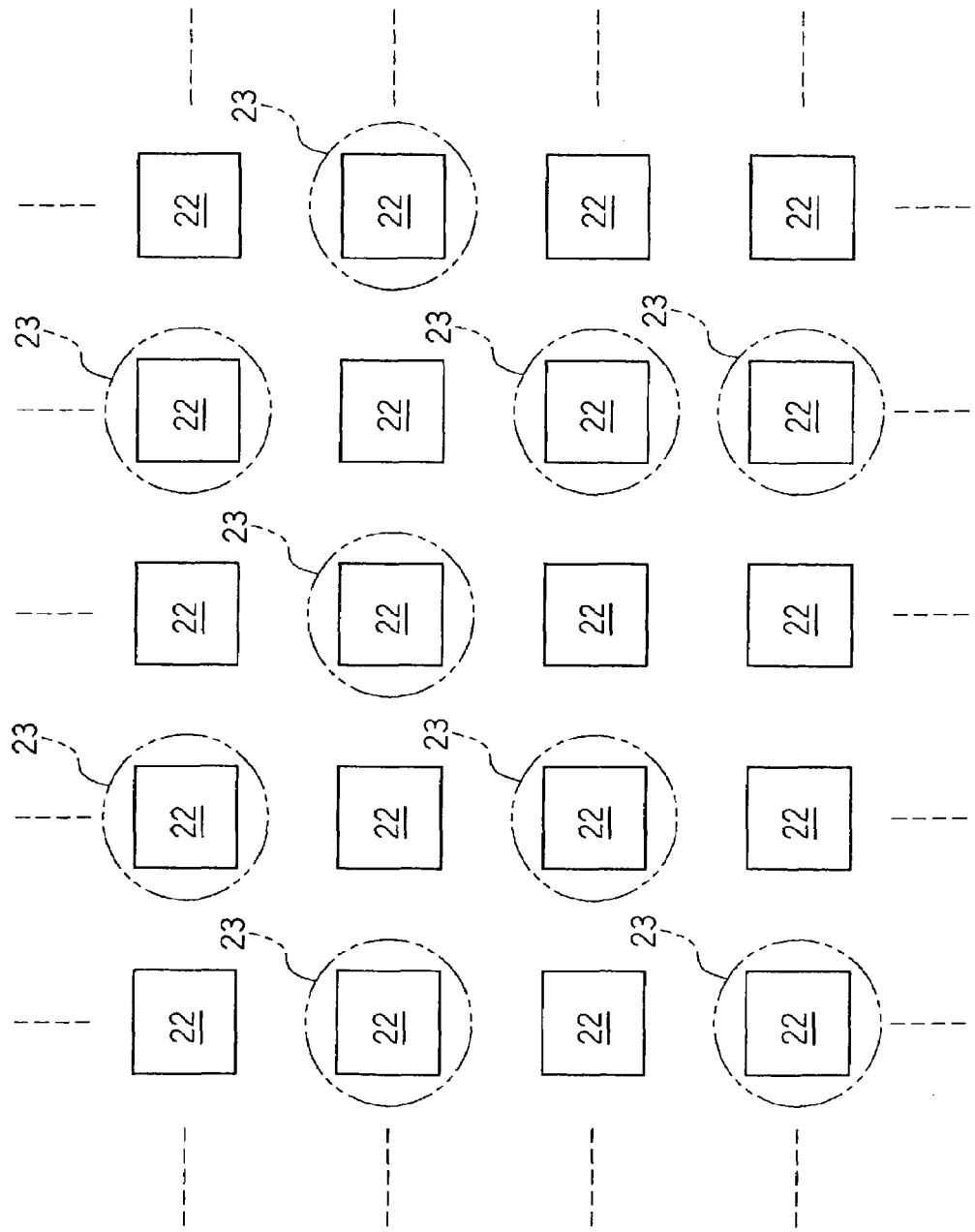
FIG. 2 is a plan view showing a main portion of another CCD image sensor of a type different from that of the CCD image sensor of FIG. 1.

FIG. 2 shows a CCD image sensor including pixels whose shape viewed from above is different from that in FIG. 1 and which are arranged in a pattern different from that in FIG. 1. That is, as shown in FIG. 2, photodiodes (pixels) 22, each has a square shape when viewed from above, are arranged at predetermined intervals in the vertical and horizontal directions on a semiconductor substrate (not shown).

Further, the photodiodes 22 at particular positions indicated by imaginary lines in FIG. 2 are photodiodes which are intentionally made defective (hereinafter simply referred to as "intentionally defective pixels") 23. The intentionally defective pixels 23 are formed by masking surfaces of the photodiodes 22 with aluminum during a process of forming optical black (OB) portions. Other portions are structured similarly to the CCD image sensor shown in FIG. 1, and therefore explanation thereof is omitted.

It should be noted that the camera can include: a signal processing section for generating digital image data representing a subject image on the basis of an output signal from the CCD image sensor and generating a timing signal for controlling the CCD image sensor, and the like; a SDRAM (Synchronous Dynamic RAM) for storing the digital image data obtained mainly by image pickup by the CCD image sensor; and a controlling section (CPU) for controlling an overall operation of the camera.

The CPU can include: an image pickup controlling section having a built-in line buffer (not shown) with a predetermined capacity; and a compression/decompression section for compressing the digital image data according to a predetermined compression format (JPEG (Joint Photographic Experts Group) format is used in the embodiment) and decompressing the compressed digital image data; which are interconnected via a bus.

The camera further can include: a display (an LCD) for displaying the subject image obtained by image pickup by the CCD image sensor and various information; an operation section provided with various operation keys such as a power switch; a storage section (a flash ROM) for storing an ID of the camera (which is used for specifying a pattern of the intentionally defective pixels 15, 23) and various parameters, and the like; and an external connection for connecting an interface 32 (see FIG. 3) such as an USB connector.

That is, there is a plurality of patterns of the intentionally defective pixels, each being unique to each camera (image pickup device). The flash ROM is built in a body of the apparatus and is unremovable from the body.

The external connection is connected to the CPU and controls communication between the CPU and an external terminal (such as a reproducing apparatus 30 shown in FIG. 3) connected via the interface 32. The signal processing section includes a correlated double sampling circuit (CDS), a gain controller, an A/D converter and a timing generator.

The signal processing section has a pixel interpolation function for making each pixel of the CCD image sensor, which corresponds to the filter pattern of the RGB primary color filter, represented in three primary colors R, G and B, and generating one RGB pixel from three (R, G and B) primary color pixels by interpolation. Namely, the signal output from the CCD image sensor is subjected to correlated double sampling at the correlated double sampling circuit, sensitivity for each R (red), G (green) and B (blue) at the CCD image sensor is adjusted by the gain controller, and the processed signal, i.e., R, G and B signals for each pixel are applied to the A/D converter.

The A/D converter converts the R, G and B signals, which are sequentially applied from the gain controller, into 12-bit R, G and B signals (hereinafter referred to as "digital image data") and outputs the R, G and B signals to the CPU. Then, the CPU accumulates the digital image data, which are sequentially input from the A/D converter, in the built-in line buffer, and once stores the digital image data in the SDRAM.

The digital image data stored in the SDRAM is read out by the CPU and is subjected to white balance adjustment by applying a digital gain on the digital image data according to a type of a light source, and then, is subjected to gamma control and sharpness adjustment for generating 8-bit digital image data. Further, the 8-bit digital image data is subjected to YC signal processing to generate a luminance signal Y and chrominance signals Cr, Cb (hereinafter simply referred to as "YC signal"), and the YC signal is again stored in the SDRAM.

When an operator presses a shutter button, the YC signal stored in the SDRAM is compressed according to the predetermined compression format at the compression/decompression section, and then, is stored in the flash ROM. That is, image data of a subject is stored in the flash ROM. Further, as shown in FIG. 3, the reproduction apparatus 30 is connected to the camera 28, and the reproduction apparatus 30 reads the digital image data stored in the flash ROM and various information such as the ID of the camera 28.

Figure 3:
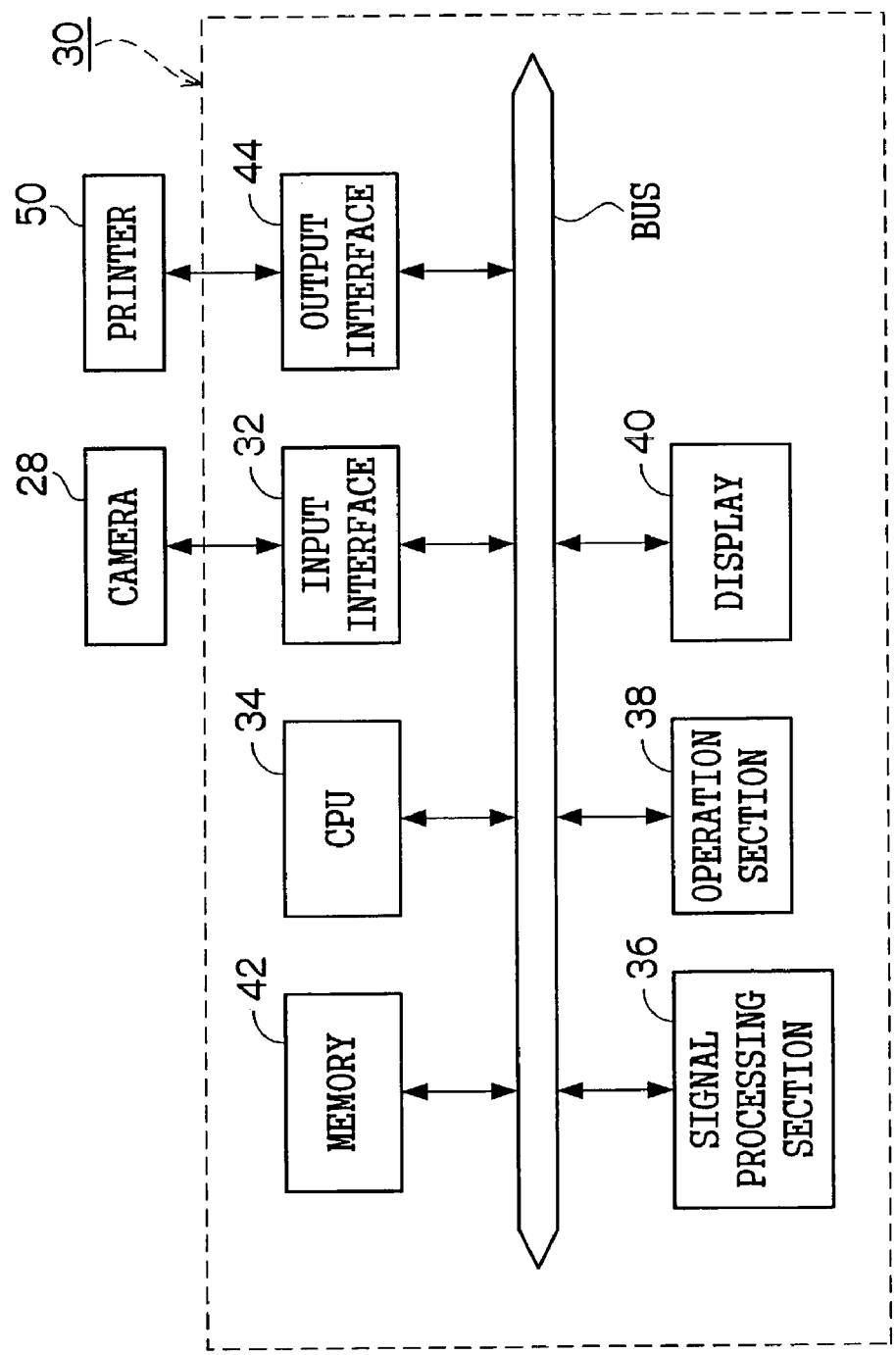
FIG. 3 is a block diagram showing a configuration of a reproducing apparatus according to the embodiment.

Next, based on FIG. 3, a configuration of the reproduction apparatus 30 is described. It should be noted that the reproduction apparatus 30 of the embodiment is a personal computer placed at a so-called lab (photo shop).

The reproduction apparatus 30 includes: a CPU (central processing unit) 34 for controlling an overall operation of the apparatus; an input interface 32, to which the camera 28, or the like, is connected; a signal processing section 36 for processing digital image data input from the input interface 32; an operation section 38 including a ten-key, and the like; a display 40 for displaying the digital image data, and the like; a memory 42 for storing the defect pattern data corresponding to patterns of the defective pixels and various information such as IDs of cameras; and an output interface 44 for outputting the digital image data, which has been subjected to image processing, and the like, at the signal processing section 36; which are interconnected via a bus BUS. It should be noted that the personal computer used as the reproduction apparatus 30 is a general type personal computer, and therefore, detailed explanation thereof is omitted.

Figures 4, 5:
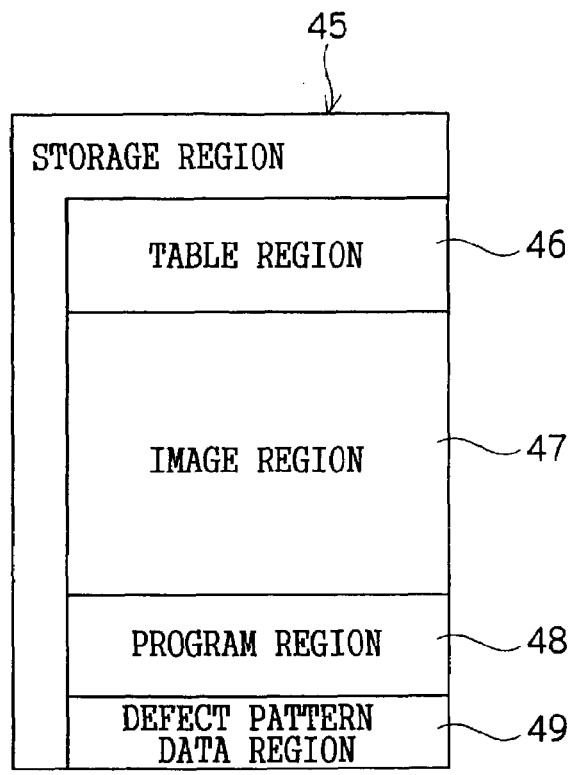
FIG. 4 is a diagram showing a memory map of a memory shown in FIG. 3.
FIG. 5 is a diagram showing a memory map of a table region shown in FIG. 4.

As shown in FIG. 4, a storage region 45 of the memory 42 includes: a table region 46 for storing, in advance, data for respectively associating IDs of cameras and defect patterns (see FIG. 5); an image region 47 for storing the digital image data from the camera 28, and the like; a program region 48 for storing, in advance, a program for correcting defects of the digital image data on the basis of the defect pattern, and the like; and a defect pattern data region 49 for storing, in advance, defect pattern data (data representing coordinates of the intentionally defective pixels, or the like) corresponding to the defect patterns in the table region 46; and the like.

Figure 6:
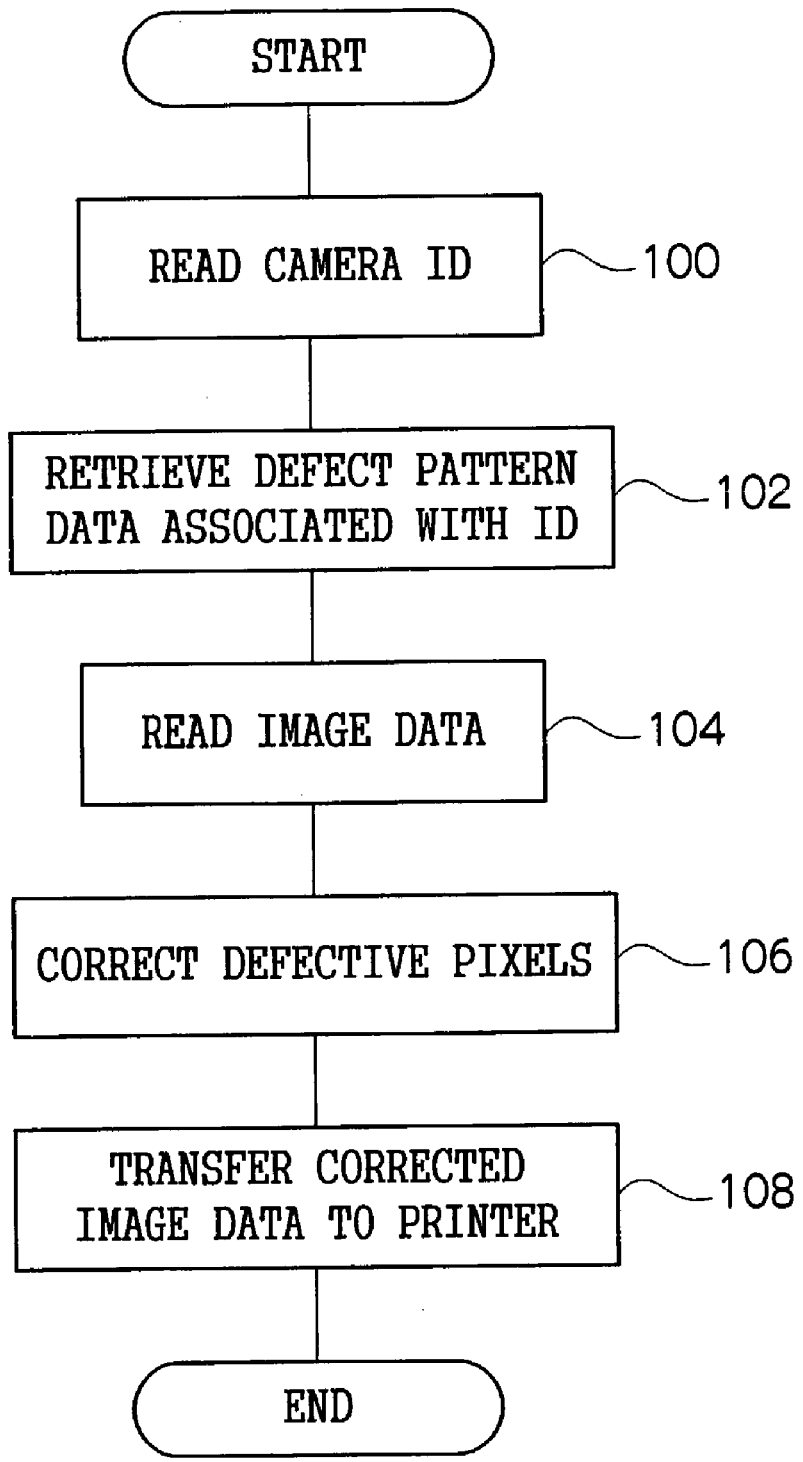
FIG. 6 is a flow chart showing a flow of a process of outputting digital image data in the reproduction apparatus according to the embodiment.

Continuously based on FIG. 6, a process of outputting the digital image data performed in the reproduction apparatus 30 shown in FIG. 3 is described. It should be noted that the process shown in FIG. 6 assumes that a sales system for selling single-use type cameras is established, and the camera 28, which has been used for shooting images, is brought to a lab, or the like. Further, the process assumes that the camera 28 is connected to the interface 32 and a printer 50 is connected to the interface 44.

As shown in FIG. 6, in step 100, the ID of the camera stored in the flash ROM of the camera 29 is read. Then, in step 102, the defect pattern data associated with the read ID of the camera is retrieved from the defect pattern data region 49 (see FIG. 4) of the memory 42 shown in FIG. 3. Namely, the defect pattern data is retrieved from the defect pattern data region 49 on the basis of the table (see FIG. 5) in which IDs of cameras and defect patterns are respectively associated.

In step 104, the digital image data output from the flash ROM of the camera 28 is read from the image region 47 (see FIG. 4). Then, in step 106, the intentionally defective pixels 15 (see FIG. 1) or 23 (see FIG. 2) are corrected on the basis of the defect pattern data. Namely, each of the defective pixels corresponding to the "defect pattern data" is corrected on the basis of data of neighboring pixels surrounding the defective pixel.

In step 108, the corrected digital image data is transferred to the printer 50 shown in FIG. 3. The printer 50 prints out an image based on the digital image data, which has been subjected to image processing at the signal processing section 36. That is, in the embodiment, the intentionally defective pixels 15, 23, which have been formed in advance, are appropriately corrected on the basis of known defect pattern data corresponding to the pattern of the intentionally defective pixels 15, 23 to obtain good image data.

It should be noted that, as described above, since the camera 28 according to the embodiment is of the single-use type, a dealer in the sales system collects the camera 28 after images are printed. After this process is completed, all of the digital image data recorded in the flash ROM of the camera 28 is deleted for the next use of the camera 28.

In the embodiment, the number of the intentionally defective pixels 15, 23, which has been formed in the predetermined pattern, exceeds the upper limit of the number of pixels storable in the memory of the camera for defect correction, or the like. Therefore, when the defect pattern data corresponding to the pattern of the intentionally defective pixels 15, 23 cannot be identified (retrieved), i.e., when using an apparatus other than the reproduction apparatus 30 storing the defect pattern data, the digital image data cannot be reproduced in a normal manner.

Thus, according to the embodiment, the intentionally defective pixels 15, 23, whose number exceeds the upper limit of the number of pixels correctable at the camera, are formed in the predetermined pattern in the CCD image sensor, and therefore, the CCD image sensor disposed in the camera 28 cannot be diverted to use in another image pickup apparatus. It should be noted that, as described above, since the CCD image sensor of the embodiment is structured to prevent diversion of use thereof, it is suitable for use in a single-use type digital camera.

Further, since the CCD image sensor (hardware) itself is provided with the intentionally defective pixels 15, 23, which are formed in the predetermined pattern and whose number exceeds the upper limit of the number of pixels correctable at the camera, in the embodiment so that picked up image data cannot be reproduced in a normal manner, no additional load is applied on processing in the camera 28, unlike a case in which image data is encrypted.

It should be noted that, although the CCD image sensor is used as the image pickup device in the above-described exemplary embodiment, a CMOS image sensor, or the like, may be used as the image pickup device according to the invention. Further, instead of forming the intentionally defective pixels 15, 23 by physically masking with aluminum, or the like, the intentionally defective pixels 15, 23 may be formed by partially making defects in transfer electrodes, or by not disposing photodiodes (pixels) at predetermined positions (so that the positions remain as openings). Further, instead of blocking light as described above, the defective pixels according to the invention may be formed so as to transmit light so that white noise, or the like, is formed.

In the invention, the defect pattern data (representing, for example, coordinates of the intentionally defective pixels 15, 23) may be encrypted. In this case, security of image data is ensured. Further, although the camera 28 is connected to the interface 32 in the exemplary embodiment, this is not intended to limit the invention. For example, SmartMedia, which is detachable with respect to the camera, may be used and the SmartMedia may be set in the reproduction apparatus 30.

Although the printer 50 is connected to the interface 44 for printing images in the embodiment, the digital image data, which has been corrected on the basis of the above-described "defect pattern data" may be recorded on other recording media such as CD-R, SmartMedia, CompactFlash, ATA card, floppy/flexible disk or CD-RW. In addition, the flow of the process of the program (see FIG. 6) in the embodiment is described by way of an example, and changes can be made as appropriate without departing from the purpose of the invention.

What is claimed is:

1. An image pickup apparatus, comprising:
    an image pickup device provided with intentional defective pixels,
    wherein the intentional defective pixels are formed in a predetermined pattern,
    wherein a number of the intentional defective pixels exceeds an upper limit of a number of pixels whose defects are correctable by said image pickup apparatus, and
    wherein identification data for specifying the predetermined pattern is recorded.

2. The image pickup apparatus according to claim 1, wherein the intentional defective pixels comprise green pixels corresponding to green components of color information among pixels in the image pickup device.

3. The image pickup apparatus according to claim 1, wherein the image pickup apparatus further comprises:
    an image pickup function device,
    wherein the image pickup apparatus is a digital camera or an electronic device capable of performing image pickup.

4. The image pickup apparatus according to claim 3, wherein the image pickup apparatus is a single-use digital camera.

5. An apparatus for processing image data, comprising:
    reading means for reading image data picked up by an image pickup apparatus comprising an image pickup device provided with intentional defective pixels that are formed in a predetermined pattern and whose number exceeds an upper limit of a number of pixels whose defects are correctable in said image pickup apparatus, said reading means further reading identification data for specifying the predetermined pattern;
    recording means for recording pattern data corresponding to the predetermined pattern of the intentional defective pixels;
    retrieving means for retrieving the pattern data corresponding to the identification data read by the reading means; and
    correcting means for correcting the image data based on the pattern data retrieved by the retrieving means.

6. The apparatus for processing image data according to claim 5, wherein the pattern data is encrypted.

7. The apparatus for processing image data according to claim 5, further comprising:
    outputting means for outputting the image data corrected at the correcting means to an external destination.

8. The apparatus for processing image data according to claim 7, wherein the outputting means includes any one or more of a printer and a recording apparatus for recording on a recording medium.

9. A method for outputting image data, comprising the steps of:
    reading image data picked up by an image pickup apparatus comprising an image pickup device provided with intentional defective pixels that are formed in a predetermined pattern and whose number exceeds an upper limit of a number of pixels whose defects are correctable in said image pickup apparatus;
    retrieving pattern data corresponding to the predetermined pattern of the intentional defective pixels while reading out said image data;
    correcting the image data based on the pattern data; and
    outputting the corrected image data.

10. The method according to claim 9, further comprising:
    reading identification data for specifying the predetermined pattern along with the image data,
    wherein said step of retrieving the pattern data includes retrieving the pattern data corresponding to the read identification data and reading said retrieved pattern data.

11. A system for processing image data, comprising:
    an image pickup apparatus, comprising
    an image pickup device provided with intentional defective pixels that are formed in a predetermined pattern and whose number exceeds an upper limit of a number of pixels whose defects are correctable in said image pickup apparatus, and wherein identification data for specifying the predetermined pattern is recorded; and
    an image data processing apparatus, comprising
    reading means for reading said image data picked up by the image pickup device of the image pick up apparatus and for reading the identification data for specifying the predetermined pattern;
    recording means for recording pattern data corresponding to the predetermined pattern of the intentional defective pixels;
    retrieving means for retrieving the pattern data associated with the identification data read by the reading means; and
    correcting means for correcting the image data based on the predetermined pattern data retrieved by the retrieving means.

12. The system according to claim 11, wherein the intentional defective pixels comprise green pixels corresponding to green components in color information among pixels in the image pickup device.

13. The system according to claim 11, wherein the image data processing apparatus further comprises outputting means for outputting the image data corrected at the correcting means to an external destination.

14. The system according to claim 11, wherein the image pickup apparatus is a digital camera or an electronic device capable of performing image pickup.

15. The system according to claim 14, wherein the image pickup apparatus is a single-use digital camera.

16. The system according to claim 11, wherein the pattern data is encrypted.

17. The system according to claim 11, wherein the outputting means is any one or more of a printer and a recording apparatus for recording on a recording medium.

18. An image pickup device, comprising:
intentional defective pixels formed in a predetermined pattern,
wherein a number of the intentional defective pixels exceeds an upper limit of a number of pixels whose defects are correctable by said image pickup device, and
wherein the intentional defective pixels comprise green pixels corresponding to green components in color information among pixels in the image pickup device.

19. An image pickup apparatus, comprising:
an image sensing device configured to sense an image of an object and generate image data corresponding to the image of the object and
an apparatus ID storage device configured to store an ID of the image pickup apparatus,
wherein the image sensing device includes a plurality of intentional defective pixels arranged in a predetermined intentional defect pixel pattern, and
wherein the predetermined intentional defect pixel pattern is associated with the ID of the image pickup apparatus.

20. The apparatus of claim 19, wherein the predetermined intentional defect pixel pattern is associated with the image sensing device.

21. The apparatus of claim 19, wherein the predetermined intentional defect pixel pattern is uniquely associated with the ID of the image pickup apparatus.

22. The apparatus of claim 19, further comprising:
an image defect correction device configured to correct defective pixel data of the image data,
wherein one or more of the pixel data corresponding to the plurality of intentional defective pixels are not correctable by the image defect correction device.

23. The apparatus of claim 22, wherein the image defect correction device is configured to correct up to a predetermined upper limit number of defective pixels, and
wherein a number of intentional defective pixels is greater than the predetermined upper limit number of defective pixels.

24. An image sensing device, comprising:
a plurality of photodiodes configured to detect light and to accumulate charges based on the detected light; and
a plurality of charge transfer channels configured to transfer the accumulated charges from the plurality of photodiodes to output image data,
wherein a plurality of intentional defects are intentionally formed in the image sensing device in a predetermined intentional defect pixel pattern, and
wherein the predetermined intentional defect pixel pattern is such that one or more defects of the image data due to the plurality of intentional defects are not correctable by an image pickup apparatus into which the image sensing device is installed.

25. The device of claim 24, wherein the predetermined intentional defect pixel pattern is uniquely associated with the image sensing device.

26. The device of claim 24, wherein the predetermined intentional defect pixel pattern is such that positions of the plurality of intentional defects all correspond to green pixel positions of the image sensing device.

27. The device of claim 24, wherein each of the plurality of intentional defects includes
a defect in a corresponding photodiode, or
a defect in a corresponding charge transfer channel, or both.

28. The device of claim 27, the defect in the corresponding photodiode includes a mask formed over the corresponding photodiode to block the light from impinging on the corresponding photodiode or the corresponding photodiode being configured to generate white noise.

29. A method to form an image sensing device, comprising:
forming a plurality of photodiodes to detect light and to accumulate charges based on the detected light; and
forming a plurality of charge transfer channels to transfer the accumulated charges from the plurality of photodiodes to output image data; and
intentionally introducing a plurality of intentional defects in the image sensing device according to a predetermined intentional defect pixel pattern, wherein the step of intentionally introducing the plurality of intentional defects includes introducing the plurality of intentional defects such that one or more defects of the image data due to the plurality of intentional defects are not correctable by an image pickup apparatus into which the image sensing device is installed.

30. The method of claim 29, further comprising:
uniquely associating the predetermined intentional defect pixel pattern with the image sensing device.

31. The method of claim 29, wherein the step of intentionally introducing the plurality of intentional defects includes:
introducing the plurality of intentional defects such that such that positions of the plurality of intentional defects all correspond to green pixel positions of the image sensing device.

32. The method of claim 29, wherein the step of intentionally introducing the plurality of intentional defects includes for each of the plurality of intentional defects:
introducing a defect in a corresponding photodiode; or
introducing a defect in a corresponding charge transfer channel; or both.

33. The method of claim 32, the step of introducing the defect in the corresponding photodiode includes:
forming a mask over the corresponding photodiode to block the light from impinging on the corresponding photodiode; or
forming the corresponding photodiode to generate white noise.

* * * * *